3,261,831
11-KETO-12β-HYDROXY PROGESTERONE
AND DERIVATIVES THEREOF
Patrick A. Diassi, Westfield, N.J., assignor, by mesne
assignments, to E. R. Squibb & Sons, Inc., New York,
N.Y., a corporation of Delaware
No Drawing. Filed Apr. 30, 1964, Ser. No. 363,970
8 Claims. (Cl. 260—239.55)

This invention relates to and has as its objects the provision of novel physiologically active steroids, methods for preparing the same and new intermediates in said preparation.

The final products of this invention are of the formula

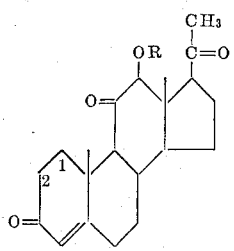

wherein the 1,2-position is saturated or double-bonded, and R is hydrogen or acyl. The preferred acyl radicals are those of hydrocarbon carboxylic acids of less than twelve carbon atoms as exemplified by the lower alkanoic acids, such as acetic, propionic, butyric and tert-pentanoic acid; the lower alkenoic acids; the monocyclic aryl carboxylic acids, such as benzoic and toluic acid; the monocyclic aryl lower alkanoic acids, such as phenylacetic and β-phenylpropionic acid; the cycloalkane carboxylic acids and the cycloalkene carboxylic acids.

The final compounds of this invention are physiologically active steroids which possess progestational activity and thus can be employed instead of progestational agents, such as progesterone for example, in the treatment of habitual abortion, for which purpose they can be administered in the same manner as progesterone, for example, with the dosage adjusted for the relative potency of the particular steroid.

The novel products of this invention are prepared by the processes of this invention which entail a number of steps starting with a 3,20-bis-ketal of 9α-fluoro-11-ketoprogesterone, such as the 3,20-bis-ethylene ketal. The steps of the process may be represented by the following equations, wherein R is as hereinbefore defined, and A is preferably a lower alkylene radical, such as ethylene, propylene-1,2, and trimethylene:

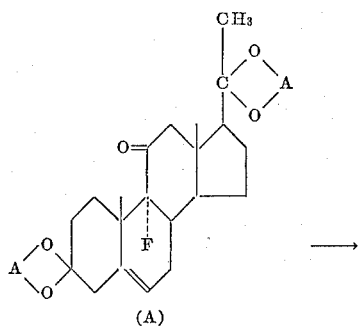

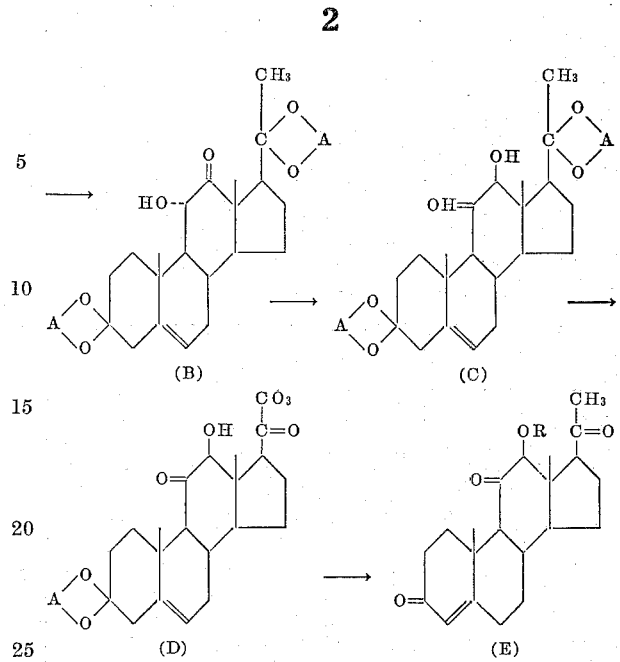

In accordance to the first step in the processes of this invention a 3,20-diketal of 9α-fluoro-11-ketoprogesterone (Compounds A) such as the 3,20-bis-ethylene ketal, is reacted with methyl lithium to yield the corresponding 3,20-diketal of 11α-hydoxy-12-ketoprogesterone (Compounds B).

Compounds B are then either reacted with a strong base, such as an alkali metal hydroxide (e.g., potassium hydroxide) to yield the corresponding 3,20-diketal of 11-keto-12β-hydroxy-progesterone (Compounds C).

Compounds C are then hydrolyzed by reacting with a dilute mineral acid, such as dilute hydrochloric acid and sulfuric acid, to yield 12β-hydroxy-11-ketoprogesterone (Compounds E, wherein R is hydrogen), if the purification process entails washing with water, or the corresponding 3-monoketal of 12β-hydroxy-11-ketoprogesterone (Compounds D) if the purification process entails washing with an acid, such as 2 N hydrochloric acid rather than water. In the latter instance, the 3-monoketal can then be hydrolyzed by treatment with water to 12β-hydroxy-11-ketoprogesterone.

If a 12β-ester is desired, 12β-hydroxy-11-ketoprogesterone is acylated in the usual manner by treatment with the acid anhydride or acyl chloride of the desired acid, the reaction preferably being conducted in the presence of an organic base, such as pyridine.

If a 1-dehydroprogesterone derivative is desired, the resulting 12β-hydroxy-11-ketoprogesterone (or its 12-ester) is treated with 2,3-dichloro-5,6-dicyanobenzoquinone, preferably at an elevated temperature, such as the reflux temperature of the solvent used to dissolve the steroid, to yield the corresponding 1-dehydro derivatives of the starting steroid.

In addition to Compounds E, Compounds C and D are new intermediates of this invention.

The following examples illustrate the invention (all temperatures being in centigrade):

Example 1.—Δ⁵-pregnene-11α-ol-3,12,20-trione
3,20-bisethylene ketal

To 453 g. of lithium shot previously washed with three, two-litter portions of ether, 28 l. of anhydrous ether are added followed by 3.26 l. of methyl iodide which are added slowly at such a rate as to maintain a controlled reflux.

A solution of 1.405 kg. of 9α-fluoro-Δ⁵-pregnene-3,11,20-trione 3,20-bisethylene ketal in 14 l. of dry benzene is then added slowly with stirring so as to maintain the temperature at 26–36°. The reaction mixture is kept at 24° for 15 hours after which the excess reagent is destroyed by the careful addition of 4 l. of methanol, followed by 18 l. of water. The organic phase is separated, and the aqueous phase is extracted three times with 15 l.-portions of benzene. The combined organic phases are then washed with water to pH 6.8, dried over sodium sulfate and concentrated, in vacuo. The crystals which separate are filtered, washed with warm hexane and dried to give about 674 g. of Δ⁵-pregnene-11α-ol-3,12,20-trione 3,20-bisethylene ketal having a melting point of about 224–226°, $[\alpha]_D^{22}$ +2.90 (chf.).

Example 2.—Δ⁵-pregnene-12β-ol-3,11,20-trione 3,20-bisethylene ketal

To a solution of 50 g. of potassium hydroxide in a mixture of 875 ml. of methanol and 125 ml. of water, 5 g. of Δ⁵-pregnene-11α-ol-3,12,20-trione 3,20-bisethylene ketal are added and the mixture refluxed for 3 hours, during which time the steroid dissolves and the solution turns amber. The solution is then cooled, diluted with 2 liters of water and extracted with ethyl acetate. The ethyl acetate extracts are combined, washed with water until neutral, dried over sodium sulfate and evaporated to dryness, in vacuo. Crystallization of the residue from acetone gives about 3.56 g. of Δ⁵-pregnene-12β-ol-3,11,20-trione 3,20-bisethylene ketal having a melting point of about 186–188°.

Similarly, if 9α-fluoro-Δ⁵-pregnene-3,11,20-trione 3,20-bis-1,2-propylene ketal and 9α-fluoro-Δ⁵-pregnene-3,11,20-trione-3,20-bis-trimethylene ketal are substituted for the bis-ethylene ketal in the procedure of Example 1 and the procedure of Example 2 is followed, the corresponding 3,20-bis-1,2-propylene ketal and 3,20-bis-trimethylene ketal derivatives are obtained, respectively.

Example 3.—12β-hydroxy-11-ketoprogesterone

To a solution of 500 mg. of Δ⁵-pregnene-12β-ol-3,11,20-trione 3,20-bisethylene ketal in 200 ml. of reagent grade methanol, 7.0 ml. of an 8% solution of sulfuric acid are added and the resulting solution refluxed for 40 minutes. After cooling the solution is neutralized carefully with 5% aqueous sodium bicarbonate diluted with 400 ml. of water and extracted with chloroform. The chloroform extracts are washed with water, dried over sodium sulfate and evaporated to dryness in vacuo. Crystallization of the residue from acetone-hexane gives about 329 mg. of 12β-hydroxy-11-ketoprogesterone having a melting point of about 179–180°, $[\alpha]_D^{22}$ +25.6° (chf.), $\lambda_{max}^{alc.}$

*Analysis.*—Calcd. for $C_{21}H_{28}O_4$ (344.44): C, 73.22; H, 8.19. Found: C, 73.41; H, 8.06.

Example 4.—Δ⁵-pregnene-12β-ol-3,11,20-trione 3-ethylene ketal

Following the procedure of Example 3 but washing the final chloroform extract with 2 N HCl in place of the water, there is obtained on crystallization of the residue from acetone Δ⁵-pregnene-12β-ol-3,11,20-trione 3-ethylene ketal having a melting point of about 198–200°. Hydrolysis of this material under the conditions of Example 3 gives 12β-hydroxy-11-ketoprogesterone.

Example 5.—12β-hydroxy-11-ketoprogesterone 12-acetate

A solution of 100 mg. of 12β-hydroxy-11-ketoprogesterone in 3 ml. of dry pyridine and 1 ml. of acetic anhydride is kept at room temperature for 18 hours, then decomposed with ice-water and extracted with chloroform. The chloroform extract is washed successively with 2 N HCl, water, 5% sodium bicarbonate and water and then evaporated to dryness in vacuo. The residue on crystallization from acetone-hexane gives 65 mg. of 12β-hydroxy-11-ketoprogesterone 12-acetate having a melting point of about 150–152°, $[\alpha]_D^{22}$ +182° (chloroform), $\lambda_{max}^{alc.}$ 237 mμ (ε, 18,000)

*Analysis.*—Calcd. for $C_{23}H_{30}O_5$: C, 71.48; H, 7.82. Found: C, 71.48; H, 7.78.

Similarly, if other esterifying agents, such as benzoyl chloride and propionic anhydride are substituted for the acetic anhydride in the procedure of Example 5, the corresponding esters of 12β-hydroxy-11-ketoprogesterone are obtained.

Example 6.—12β-hydroxy-11-keto-1-dehydroprogesterone

A solution of 172 mg. of 12β-hydroxy-11-ketoprogesterone and 125 mg. of 2,3-dichloro-5,6-dicyanobenzoquinone in 10 ml. of purified dioxane is refluxed under nitrogen for 6 hours, then cooled, filtered and washed with dioxane. The filtrate is diluted with an equal volume of chloroform and then adsorbed onto 10 g. of Woelm neutral alumina (Activity I). Elution with chlorofrom followed by evaporation of the solvent, in vacuo, and crystallization of the residue gives 12β-hydroxy-11-keto-1-dehydroprogesterone.

The invention may be otherwise embodied within the scope of the appended claims.

What is claimed is:

1. A compound selected from the group consisting of steroids of the formula

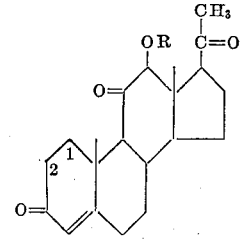

and the 1,2-dehydro derivatives thereof, wherein R is selected from the group consisting of hydrogen and the acyl radical of a hydrocarbon carboxylic acid of less than twelve carbon atoms.

2. 11-keto-12β-hydroxyprogesterone.
3. 11-keto-12β-hydroxyprogesterone 12-acetate.
4. 11-keto-12β-hydroxy-1-dehydroprogesterone.
5. The 3,20-bis-lower alkylene ketal of 11-keto-12β-hydroxyprogesterone.
6. The 3,20-bis-ethylene ketal of 11-keto-12β-hydroxyprogesterone.
7. The 3-mono-lower alkylene ketal of 11-keto-12β-hydroxyprogesterone.
8. The 3-mono-ethylene ketal of 11-keto-12β-hydroxyprogesterone.

References Cited by the Examiner

UNITED STATES PATENTS

| | | | |
|---|---|---|---|
| 3,030,391 | 4/1962 | Diassi | 260—397.45 |
| 3,126,374 | 3/1964 | Ringold et al. | 260—239.55 |
| 3,134,791 | 5/1964 | Djerassi et al. | 260—239.55 |
| 3,185,713 | 5/1965 | Becker et al. | 260—397.45 |

LEWIS GOTTS, *Primary Examiner.*

JOHNNIE R. BROWN, *Assistant Examiner.*